United States Patent [19]

Owers

[11] Patent Number: 4,734,585

[45] Date of Patent: Mar. 29, 1988

[54] PASSIVE INFRA-RED SENSOR

[75] Inventor: Ian A. Owers, Aberdour, Scotland

[73] Assignee: Racal-Guardall (Scotland) Ltd., Midlothian, Scotland

[21] Appl. No.: 886,038

[22] Filed: Jul. 16, 1986

[30] Foreign Application Priority Data

Jul. 17, 1985 [GB] United Kingdom ................. 8518004
Dec. 20, 1985 [GB] United Kingdom ................. 8531491

[51] Int. Cl.4 .......................... G08B 13/18; G01J 5/08

[52] U.S. Cl. .................................... 250/353; 250/342; 250/349

[58] Field of Search ........................ 250/342, 353, 349

[56] References Cited

U.S. PATENT DOCUMENTS

| | | | |
|---|---|---|---|
| 2,198,725 | 4/1940 | Smith | 250/338 |
| 2,975,284 | 3/1961 | Osborne . | |
| 3,480,775 | 11/1969 | Osborne | 250/350 |
| 4,263,585 | 4/1981 | Schaefer | 250/342 |
| 4,275,303 | 6/1981 | Mudge | 250/342 |
| 4,317,992 | 3/1982 | Stauffer | 250/221 |
| 4,321,594 | 3/1982 | Galvin et al. | 250/342 |
| 4,529,874 | 7/1985 | Zierhut | 250/221 |

FOREIGN PATENT DOCUMENTS

| | | | |
|---|---|---|---|
| 0070364 | 1/1983 | European Pat. Off. . | |
| 0080114 | 6/1983 | European Pat. Off. . | |
| 1551541 | 8/1979 | United Kingdom | 250/342 |
| 2074314 | 4/1980 | United Kingdom . | |
| 2124363 | 2/1984 | United Kingdom . | |
| 2145813 | 4/1985 | United Kingdom . | |

*Primary Examiner*—Carolyn E. Fields
*Attorney, Agent, or Firm*—Leydig, Voit & Mayer

[57] ABSTRACT

A passive infra-red sensor includes a window in a housing which also houses an infra-red detector. The window defines a plurality of infra-red transmitting strips which are separated by Fresnel lens segments or infra-red opaque strips. The infra-red transmitting strips provide short range sensitivity. The Fresnel lens segments where provided give longer range sensitivity.

6 Claims, 6 Drawing Figures

PASSIVE INFRA-RED SENSOR

BACKGROUND OF THE INVENTION

1. Technical Field

The present invention relates to passive infra-red security sensors.

2. Prior Art

Such sensors are used in intruder detection systems and rely on detecting fluctuations in the infra-red radiation falling on an infra-red sensitive detector which are caused by movement in the field of view of the detector. In passive infra-red sensors currently on the market, the field of view of the infra-red detector is divided into a plurality of discrete zones so that, as the intruder crosses the zones, the infra-red input to the detector fluctuates. This fluctuation above the ambient level of infra-red radiation received by the detector from the surroundings can be detected by suitable electronic circuitry. By appropiately tuning the frequency to which the electronic circuitry is sensitive, the presence of an intruder can be distinguished from long term, relatively slow fluctuations in the ambient infra-red radiation level.

In prior art passive infra-red sensors, the zones are defined by an optical arrangement such as a multifaceted mirror. A passive infra-red sensor using such mirrors is described in U.S. Pat. No. 3,703,718. This reference also discloses the general type of electronic circuitry suitable for use with such passive infra-red sensors.

The optical system for defining the zones may also be defined by a segmented Fresnel lens. Such a sensor is disclosed in GB-A-No. 2 124 363. When the zones are defined by optical arrangements such as a segmented Fresnel lens or a multi-faceted mirror, the radiation is focused onto the detector. Thus the field of view of the detector in a plane parallel to the mounting plane of the detector will be relatively small close to the detector. An intruder crossing in front of and close to the unit causes a high frequency signal. The sensitive elements, having some thermal mass, cannot easily respond to higher frequency heat signals, and their sensitivity generally decreases at 20 dB/decade above approx. 0.5 Hz. Thus targets close to the unit generate a relatively small signal output because of their high frequency. This results in reduced sensitivity close to the sensor itself.

The size of the field of view is also important in determining the sensitivity of the sensor. If an intruder substantially fills the field of view as he passes across it, then nearly all of the radiation emanating from the intruder will be focused onto the detector giving a high probability of detection. The greater amount of radiation can compensate for the reduction in signal caused by its higher frequency. If, however, the field of view is so small that it can be filled by a rat or mouse then the presence of such an animal may also trigger the sensor effectively causing a false alarm. If the field of view only covers a small portion of the intruder then insufficient energy may be focused onto the detector to overcome the poor high frequency response of the detectors so an alarm condition will not be produced. Therefore, a sensor using focusing optical arrangements tends to have very poor sensitivity close to the sensor but good longer range characteristics.

It has also been proposed to provide very short range sensor designed for energy saving in which no optics at all are employed. Such a sensor uses a detector disposed behind a window which itself effectively defines a single large zone. Such a sensor is capable only of detecting movement close to the unit, typically within a range of about 3 meters since at any distance from the detector the zone becomes so large that as an intruder enters the zone it does not produce any significant change in the amount of infra-red radiation being received by the detector.

As well as single element detectors, passive infra-red sensors using multiple element detectors have been proposed. For example, dual element detectors are commonly used. Each element of the detector is itself a separate infra-red detector. The elements are referred to as positive and negative elements respectively in dependence on the sense of the output deviation for a given variation in the incident radiation. The optics are arranged to that the zones of each element are different so that an intruder will cause a variation in the infra-red radiation falling on one element relative to the other. The outputs from the elements are processed to produce a differential output. If the differential output exceeds a predetermined threshold an alarm signal is produced. In this way variations in the overall intensity of the ambient infra-red radiation falling on the detector are compensated.

With this type of detector it is possible for the zones of the respective elements to overlap so that at some plane remote from the detector the zones provide sheet coverage, so that the combined zones give a field of coverage in the shape of a beam with a large included angle, in excess of 90%, centred on the sensor. In this way any intruder passing through the vertical plane where sheet coverage is provided must be detected. In conventional passive infra-red sensors such sheet coverage can only be provided by distorting the optics. The provision of optical arrangements for such coverage can result in very expensive and complicated designs.

SUMMARY OF THE INVENTION

An object of the invention is the provision of a passive infra-red sensor which is capable of providing sensitivity over a large range including short ranges close to the sensor.

A further object is the provision of an economical, short range, passive infra-red sensor which is preferably capable of providing sheet coverage.

In one aspect, the present invention provides a passive infra-red sensor comprising a housing having a window, and an infra-red detector within said housing, said window defining an alternating sequence of infrared transmitting strips through which infra-red radiation may pass unfocused onto the detector, and lens segments which focus infra-red radiation onto said detector.

Such a passive infra-red sensor provides zones through the infra-red transmitting strips which are effective at short range, and zones through the lens segments which provide fields of view appropriate to sensitivity at longer ranges. The combination of the strips and lens segments therefore provides a passive infra-red sensor which is effective over a much wider range than existing sensors and is therefore far less easy for an intruder to evade.

Preferably the housing defines slots which provide continuations of at least some of the strips. The slots preferably extend into a portion of the housing adapted to face downwardly when the sensor is in a mounted position. In this way the fields of view of the infra-red detector through these extended slots extends beneath the sensor itself and therefore coverage may be provided close to the wall on which the sensor is mounted.

Passive infra-red sensors in accordance with the invention will now be described, by way of example only, with reference to the accompanying diagrammatic drawings.

DESCRIPTION OF PREFERRED EMBODIMENTS

Figure 1:
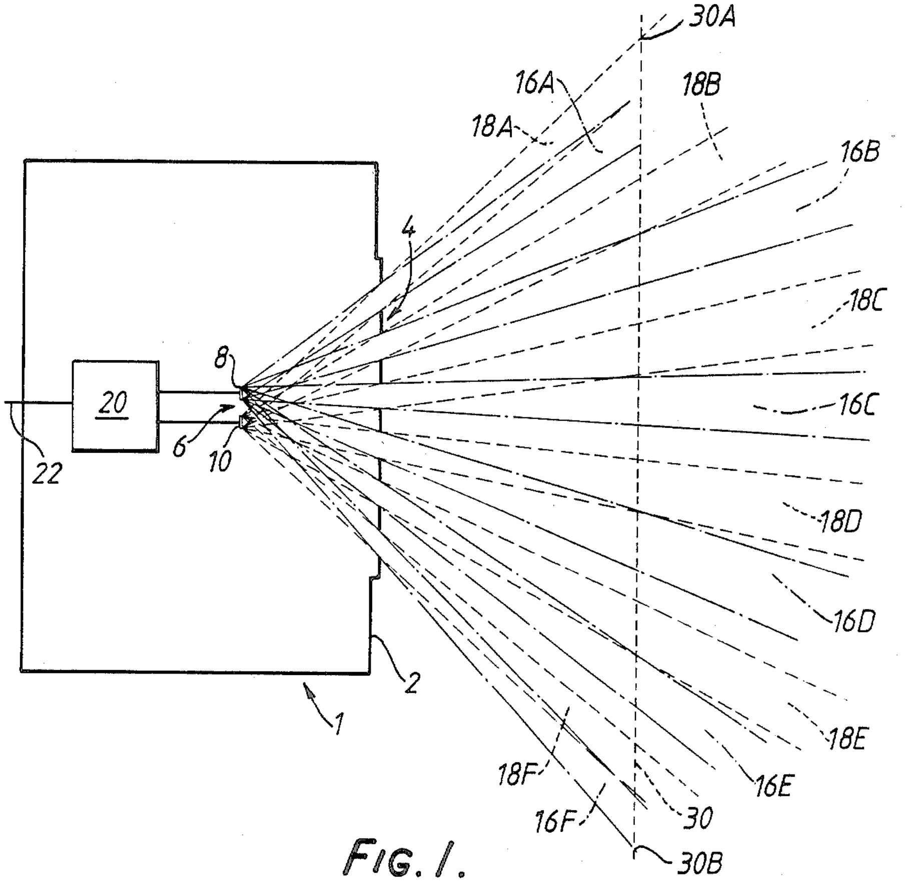
FIG. 1 is a diagrammatic transverse cross-section through a first embodiment of a passive infra-red sensor.
Figure 2:
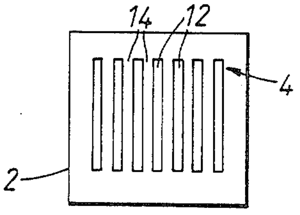
FIG. 2 is a front view showing the window of the sensor of FIG. 1.

The passive infra-red sensor illustrated in FIGS. 1 and 2 is a short range passive infra-red sensor primarily intended for residential use comprising a housing 2 with a window 4. The housing 2 contains a dual element infra-red detector 6 comprising two elongate elements 8,10 of approximately 1 mm by 2 mm dimensions. The shorter dimension is visible in the plan view of FIG. 1.

The window 4 is arranged parallel to the plane of the detector and this is normally a vertical plane in use. The window 4 is defined by a mask as shown in FIG. 2 which comprises a number of parallel vertical infra-red opaque strips 14 separted by infra-red transmitting strips 12 which may be open apertures or slots or be made of infra-red transmitting material. This mask defines a series of alternating positive and negative zones for the positive and negative elements 8,10 respectively of the detector 6. Each of the positive zones 16A–16F for the element 8 is shown in FIG. 1. The number of zones is determined by the number of infra-red transmitting strips 12 in the window. A corresponding number of negative zones 18A–18F is defined for the other element 10 of the detector 6. The negative zones 18A–18F each correspond with one adjacent positive zone 16A–16F. There are small gaps between each pair of adjacent zones. It is necessary to place the mask relatively close to the dual element detector and generally significantly closer than the focal length of typical prior art optical arrangements (e.g. 30 mm) in order to achieve zone separation. If the zones overlap too much they cancel each other out. The mask dimensions are also important and the width and spacing of the opaque strips should be designed so that proper zone definition for each element is provided. It will be appreciated that by a suitable selection of the dimensions of the mask strips and the spacing between the mask and the detector 6 a substantially complete vertical screen coverage can be provided over a solid angle in excess of 90° at a short range. The overall range of the detector is limited by the distance at which the fields of view of the zones in a vertical plane parallel to the detector 6 becomes too large. It has been found that a detector of this type can readily be made sensitive to a range of up to approximately 6 meters. As illustrated in FIG. 1 a number of substantially complete vertical screens are achieved out to the plane 30 between the points 30A and 30B. These screens will also have a substantial vertical extent which is limited by the vertical height of the window and the distance between the window and the detector.

In one embodiment of the detector according to the present design the detector to mask distance was selected at 9.5 mm, the width of the opaque strips as 1.5 mm and the width of the intermediate transmitting strips as 1.8 mm. Such a system provides good vertical screen coverage to a 4 meter range from the sensor thus overcoming a disadvantage of normal optical arrangements. Because the detector 6 is relatively close to the window 4, the whole sensor can be made very compact.

The window 4 may contain the opaque strips. Alternatively a separate mask can be applied to either surface of an infra-red transmitting window. The window may also be placed internally of a separate protective infrared tansmitting window.

The output from the dual elements of the detector 6 is processed in a conventional way by a sensor circuit 20. Various possible designs for such circuits are well known to those skilled in the art and will not be described further herein. Essentially the circuit adds the output from the positive element 8, representing the infra-red input from the positive zones to the output from the negative element 10 representing the infra-red input from the negative zones, which output deviates in the opposite sense for a given variation in the radiation from the output of the positive element. A signal is produced to output 22 when the value of this sum, which represents the difference in infra-red radiation falling on one of the elements relative to the other element, exeeds a predetermined threshold indicative of the presence of an intruder within one of the sensor zones.

Figure 3:
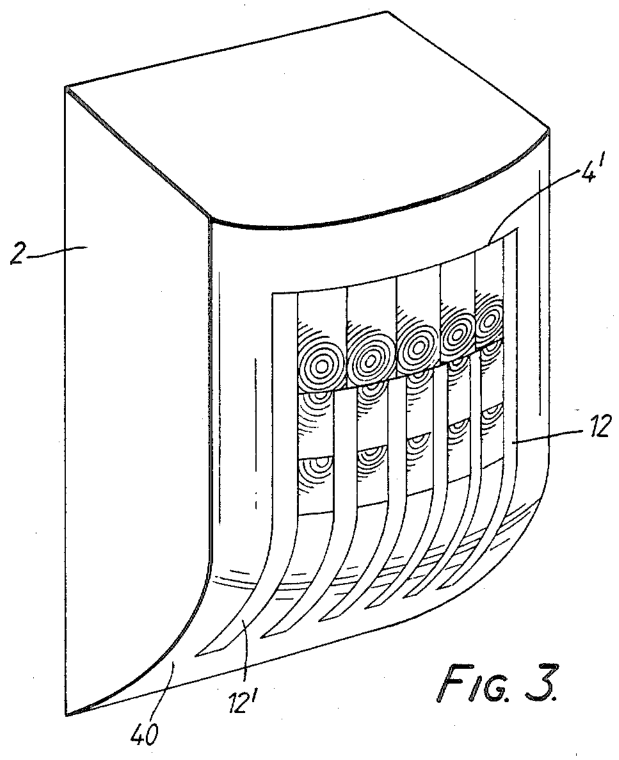
FIG. 3 is a perspective view of a second embodiment of a passive infra-red sensor.
Figure 4:
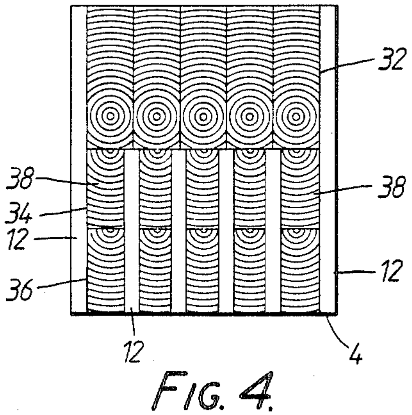
FIG. 4 is a detail showing the window construction used in the sensor of FIG. 3.
Figure 5:
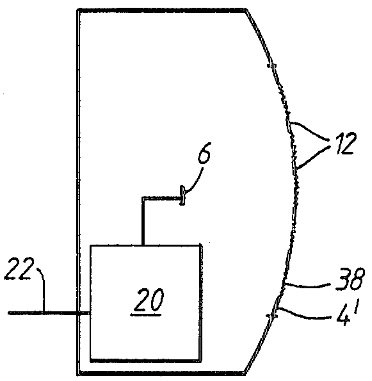
FIG. 5 is a diagrammatic transverse cross-section through the sensor of FIG. 3.

The passive infra-red sensor described with reference to FIGS. 3 to 5 is similar to the sensor described with reference to FIGS. 1 and 2 and the same reference numerals are used for corresponding parts. However, in this sensor the design of the window 4' is such as to permit effective long range detection as well as the short range protection provided by the previous sensor. Because of this window design it is not essential that a multiple element detector be used as in the previous example where a dual element detector is shown. In the present case the sensor will operate effectively with only a single element detector 6. When a single element detector is used the circuit 20 includes a band limited amplifier which produces an alarm signal on output line 22 when the infra-red radiation reaching the detector 6 within a predetermined frequency range has an amplitude in excess of a predetermined threshold. Such circuits are conventional and will therefore not be described further in detail.

The window 4' which is mounted in the front of the housing 2 is bowed in transverse cross-section about a substantially vertical axis so that it forms a portion of a cylindrical surface. This increases the angle of coverage in a horizontal plane when the sensor is mounted vertically.

The window 4' is divided into three sections. The upper section 32 is of substantially conventional construction with five adjacent Fresnel lens segments which each focus radiation from a respective zone onto the infra-red detector 6 mounted inside the housing 2. The axis of the zones defined by the Fresnel lens segments of the upper section 32 is arranged to be substantially horizontal. The two lower sections 34,36 are each composed of alternating infra-red transmitting strips 12 and Fresnel lens segments 38. The Fresnel lens segments 38 in the sections 34 and 36 are designed so that the zones defined through the Fresnel lens segments of the lower sections are inclined at an angle to the horizontal with those of the lowest section 36 being more steeply inclined than those of the central section 34. In this way the zones defined by the Fresnel lens segments in all three sections of the window provide coverage over a significant vertical extent.

The Fresnel lens segments 38 in the two lower sections 34,36 of the window are separated by plain strips 12 through which infra-red radiation can pass directly to the infra-red detector without being focused. Therefore, separate zones are defined through each of these slots 12. These zones have large fields of view determined solely by the dimensions of the strip, in particular the fields of view have a large vertical extent extending either side of the horizontal plane of the detector. These zones provide good short range sensitivity which is unavailable via the Fresnel lens segments.

The strips at either side of the window 4' extend over the entire vertical extent of the window. The portion of the window 4' which is shown in FIG. 4 may be produced by a one-piece moulding of plastics material so that the strips 12 are defined by plain areas of infra-red transmitting plastics material while the lens segments are appropriately shaped.

As shown in FIG. 3, the base 40 of the housing 2 is formed as part of a cylindrical surface curved around a substantially horizontal axis. The strips 12 are continued in this curved surface by cut-out slots 12' aligned with the strips. Since the currently available infra-red detectors 6 have a wide viewing angle in a vertical plane, infra-red radiation passing through these slots 12' of the slots will be received by the detector 6 so that the sensor can detect an intruder even if he is passing underneath the sensor.

Although the field of view defined by a strip and slot is relatively large in extent, since an intruder will be close to the sensor, although he does not fill the whole of the field of view, a significant amount of radiation will be received because of his close proximity to the detector 6. Therefore sufficient energy will be received from the intruder when in one of the zones defined by the slots 12 to produce a fluctuation as he crosses the zone which will exceed the threshold to generate an alarm signal on output 22. It will also be appreciated that infra-red radiation suffers no or relatively low loss as it passes through the plain strips or slots compared to the losses suffered in passage through the Fresnel lens segments.

The processing circuit 20 essentially comprises a band limited amplifier for detecting infra-red variations at low frequency caused by an intruder crossing the zones. As discussed in the introduction the response of the elements of the detector falls-off for frequencies in excess of 0.5 Hz. If gain is added in the amplifier to increase the sensitivity to high frequencies then noise becomes a problem causing false alarms. High frequencies are usually encountered when the intruder is moving rapidly across the zones because the zones are relatively close together as within a short range of the detector. In the present sensor, because the slots provide less loss of infra-red radiation and allow more energy to be received by the detector there is an increase in the infra-red energy received by the detector at such short ranges when the frequency is high which compensates for the reduced response of the amplifier at such frequencies. Therefore, it is not necessary to reduce the threshold to provide the required sensitivity at shorter ranges, which could give rise to unnecessary false alarms.

Figure 6:
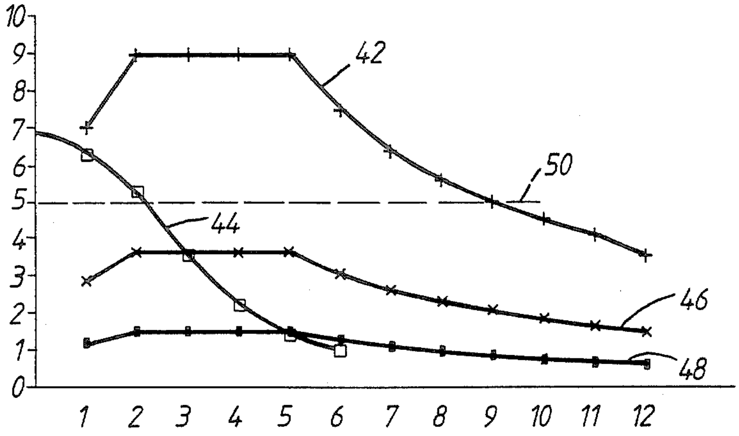
FIG. 6 is a plot of the magnitude (on the ordinate) of the output signal from the infra-red detector (after amplification) versus the range (on the abscissa) for infrared radiation received by the detector through the various components of the window in the sensor of FIG. 3.

FIG. 6 shows the signal level produced by the detector 6 in response to radiation received through various portions of the window 4' for an intruder moving at approximately 0.5 meters per second across the fields of view of the sensor at various ranges shown in meters along the abscissa. Plot 42 shows the signal from the output of the amplifier 22 for radiation received through the main Fresnel lens segments of the window portion 32. Plot 44 shows the signal from the output of the amplifier 22 for radiation received through the strips 12 and slots 12', plot 46 shows the level of signal from the output of the amplifier 22 for radiation received through the Fresnel lens segments 38 of the central section 34, and plot 48 shows the signal from the output of the amplifier 22 for radiation received through the Fresnel lens segments of the lower section 36 of the window 4'. For this experiment, the sensor was positioned so that the intruder crossed directly through the zones defined by the main portion 32 of the window 4' and therefore the signal from the output of the amplifier 22 when the intruder is within 2 to 5 meters of the detector is sufficient to cause an alarm condition but falls off at longer ranges because the frequecy is low and the intruder no longer fills the zone. However, at ranges less than 2 meters the signal from the output of the amplifier 22 for radiation received through these Fresnel lens segments rapidly decreases and is insignificant at ranges less than 1 meter. However, the level of radiation received through the slots as shown by the plot 44 continues to increase at the short ranges. For example, if a threshold level is set at 5 on the scale of signal level as shown by the line 50 in FIG. 6, the sensor will produce an alarm signal for this type of intruder at any range from 0 to 9 meters from the sensor. For other types of intruder, the level of radiation received from the downwardly directed zones provided through the Fresnel lens segments 38 of the lower sections of the window 4' may be greater, for example, for an intruder who is crawling at low levels and therefore would fill one of these downwardly inclined zones.

I claim:

1. A passive infra-red sensor including
a housing
a window defined in said housing, and
an infra-red detector mounted within said housing behind said window,
said window defining an alternating sequence of infra-red transmitting strips which allow infra-red radiation to pass unfocused onto the detector, and lens segments positioned for focusing infra-red radiation onto said detector.

2. A sensor according to claim 1, in which the housing defines slots which provide continuations of at least some of said strips.

3. A sensor according to claim 2, in which at least some of said slots extend into a portion of the housing which faces downwardly when the sensor is in a mounted position.

4. A sensor according to claim 1, in which the lens segments are Fresnel lens segments.

5. A sensor according to claim 1, in which said window is bowed in transverse cross-section.

6. A sensor according to claim 1, in which said window further defines at least one row of adjacent Fresnel lens segments above said alternating sequence of infrared transmitting strips and lens segments.

* * * * *